United States Patent
Yamanaka et al.

(10) Patent No.: US 9,070,914 B2
(45) Date of Patent: Jun. 30, 2015

(54) METHOD OF CONTROLLING WATER CONTENT OF FUEL CELL AND FUEL CELL SYSTEM

(75) Inventors: Tomio Yamanaka, Tokai (JP); Tomotaka Ishikawa, Aichi-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 118 days.

(21) Appl. No.: 13/389,946

(22) PCT Filed: Aug. 14, 2009

(86) PCT No.: PCT/JP2009/064357
§ 371 (c)(1),
(2), (4) Date: Feb. 10, 2012

(87) PCT Pub. No.: WO2011/018856
PCT Pub. Date: Feb. 17, 2011

(65) Prior Publication Data
US 2012/0141899 A1    Jun. 7, 2012

(51) Int. Cl.
*H01M 4/08* (2006.01)
*H01M 8/04* (2006.01)

(52) U.S. Cl.
CPC ...... *H01M 8/04291* (2013.01); *H01M 8/04388* (2013.01); *H01M 8/04492* (2013.01); *H01M 8/04798* (2013.01); *Y02E 60/50* (2013.01)

(58) Field of Classification Search
CPC .......... H01M 8/04313; H01M 8/0438; H01M 8/04395; H01M 8/04492; H01M 8/04746; H01M 8/04753; H01M 8/04761; H01M 8/04843; H01M 8/04835; H01M 8/10; H01M 2008/1095; H01M 8/04388; H01M 8/04291; H01M 8/04925; H01M 8/04798
See application file for complete search history.

(56) References Cited

U.S. PATENT DOCUMENTS

| | | | |
|---|---|---|---|
| 6,887,605 B2* | 5/2005 | Herron | 429/425 |
| 2004/0121218 A1* | 6/2004 | Andrews | 429/38 |
| 2007/0072016 A1* | 3/2007 | St-Pierre et al. | 429/13 |
| 2007/0134527 A1* | 6/2007 | Desouza et al. | 429/22 |
| 2011/0008699 A1* | 1/2011 | Hashimoto et al. | 429/444 |

FOREIGN PATENT DOCUMENTS

| | | |
|---|---|---|
| CN | 1661839 A | 8/2005 |
| JP | 2000-106206 A | 4/2000 |
| JP | 2002-373692 A | 12/2002 |
| JP | 2006-216255 A | 8/2006 |

(Continued)

OTHER PUBLICATIONS

International Search Report mailed Nov. 24, 2009 of PCT/JP2009/064357.

*Primary Examiner* — Ula C Ruddock
*Assistant Examiner* — Lisa S Park Gehrke
(74) *Attorney, Agent, or Firm* — Kenyon & Kenyon LLP

(57) ABSTRACT

The present invention is to properly adjust a water content in a cell of a fuel cell in response to a wide variety of conditions. A method of controlling a water content in a cell of a fuel cell, wherein a flow rate and pressure of a hydrogen gas supplied to an anode electrode of the cell of the fuel cell are adjusted so as to satisfy a restrictive condition in order to control a water content in the cell of the fuel cell. A water content state in the cell is detected and, based on the detection result, a flow rate and pressure of the hydrogen gas are adjusted so that a water content in the cell equals a target water content.

6 Claims, 11 Drawing Sheets

(56) References Cited

FOREIGN PATENT DOCUMENTS

| JP | 2007-265956 A | 10/2007 |
| JP | 2008-103137 A | 5/2008 |
| WO | WO2008047211 A1 * | 4/2008 |
| WO | WO2009118649 * | 10/2009 |

* cited by examiner

METHOD OF CONTROLLING WATER CONTENT OF FUEL CELL AND FUEL CELL SYSTEM

This is a 371 national phase application of PCT/JP2009/064357 filed 14 Aug. 2009, the contents of which are incorporated herein by reference.

The present invention relates to a method of controlling a water content of a fuel cell and a fuel cell system.

BACKGROUND ART

As is conventionally known, in order to efficiently generate electricity with a polymer electrolyte fuel cell, it is desirable to place the inside of cells in a moderately wet condition and to avoid an excessive or deficient moisture content in the fuel cell. For example, a technique described in Patent Document 1 is known as a technique for controlling a moisture content in a cell of a fuel cell. With the technique according to Patent Document 1, a water content in a cell is adjusted by reducing pressure of gas (for example, hydrogen gas) at an anode electrode to increase water displacement from a cathode electrode to the anode electrode.

Patent document 1: Patent Publication JP-A-2008-103137

However, in reality, there are cases where reducing the gas pressure at the anode electrode is insufficient for achieving adjustment to a desired water content. For example, when gas pressure is drastically reduced in an attempt to increase water content, a hydrogen gas partial pressure at the anode electrode may decrease and an electrical generation output of the fuel cell may decrease. In addition, when gas pressure at the anode electrode side is drastically reduced, a risk arises that discharge of offgas or the like from the anode electrode to the outside using a difference in pressure cannot be sufficiently performed.

The present invention has been made in consideration of the points described above and an object thereof is to provide a method of controlling a water content of a fuel cell and a fuel cell system which are capable of properly adjusting a water content in a cell of a fuel cell in accordance with a wide variety of conditions.

SUMMARY

In order to achieve the object described above, the present invention is a method of controlling a water content in a cell of a fuel cell, wherein a flow rate and pressure of a fuel gas supplied to an anode electrode of a cell of a fuel cell are adjusted so as to satisfy a restrictive condition in order to control a water content in the cell of the fuel cell.

According to the present invention, a water content in a cell can be properly adjusted in accordance with a wide variety of restrictive conditions by adjusting a flow rate and pressure of a fuel gas supplied to an anode electrode of a cell of a fuel cell.

The restrictive condition may be that a flow rate of the fuel gas does not exceed a flow rate at which a water displacement from a cathode electrode to an anode electrode in a cell reaches an upper limit.

In addition, the restrictive condition may be that a predetermined partial pressure of a fuel gas supplied to the anode electrode in the cell is secured.

Furthermore, the restrictive condition may be that discharge characteristics of a gas discharged from the anode electrode in the cell are secured.

The restrictive condition may be that an upper limit of a power loss of a gas circulator, which processes offgas discharged from the fuel cell and which supplies the processed offgas to an anode electrode in a cell of the fuel cell, is not exceeded.

In the method of controlling a water content of a fuel cell described above, a water content state in a cell may be detected and, based on the detection result, a flow rate and pressure of the fuel gas may be adjusted so that a water content in the cell equals a target water content.

In the method of controlling a water content of a fuel cell described above, a water content state at a predetermined position in an anode electrode plane of a gas flow channel on a side of an anode electrode of the cell may be detected and, based on the detection result, a flow rate and pressure of the fuel gas may be adjusted so that a water content at the predetermined position of the cell equals a target water content.

The present invention according to another perspective is a fuel cell system having a fuel cell, the fuel cell system comprising a control unit that adjusts a flow rate and pressure of a fuel gas supplied to an anode electrode of a cell of a fuel cell so as to satisfy a restrictive condition in order to control a water content in the cell of the fuel cell.

According to the present invention, a water content in a cell can be properly adjusted in accordance with a wide variety of restrictive conditions by adjusting a flow rate and pressure of a fuel gas supplied to an anode electrode of a cell of a fuel cell.

The restrictive condition may be that a flow rate of the fuel gas does not exceed a flow rate at which a water displacement from a cathode electrode to an anode electrode in a cell reaches an upper limit.

The restrictive condition may be that a predetermined partial pressure of a fuel gas supplied to the anode electrode in the cell is secured.

The restrictive condition may be that discharge characteristics of a gas discharged from the anode electrode in the cell are secured.

The restrictive condition may be that an upper limit of a power loss of a gas circulator, which processes offgas discharged from the fuel cell and supplies the processed offgas to an anode electrode in a cell of the fuel cell, is not exceeded.

The fuel cell system described above may comprise a detecting member that detects a water content state in a cell, wherein the control unit may adjust, based on a detection result by the detecting member, a flow rate and pressure of the fuel gas so that a water content state in the cell equals a target water content.

The detecting member may detect a water content state at a predetermined position in an anode electrode plane of a gas flow channel on a side of an anode electrode of the cell, and the control unit may adjust, based on a detection result by the detecting member, a flow rate and pressure of the fuel gas so that a water content at the predetermined position of the cell equals a target water content.

DETAILED DESCRIPTION

Hereinafter, a preferred embodiment of the present invention will be described with reference to the accompanying drawings. First, an outline of a fuel cell system having a fuel cell will be provided, followed by a description of a method of controlling a water content of a fuel cell that is used in the fuel cell system.

Figure 1:
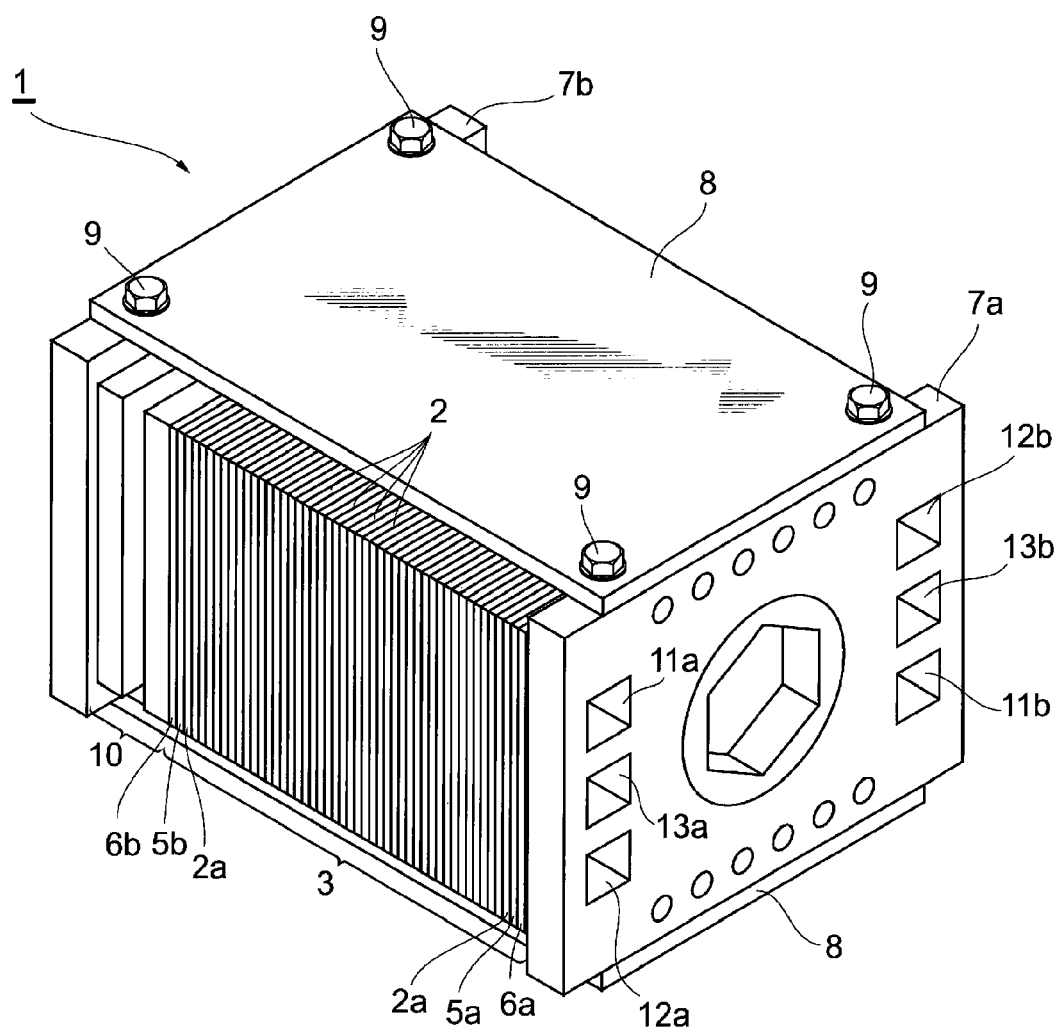
FIG. 1 is a perspective view of a fuel cell.
Figure 2:
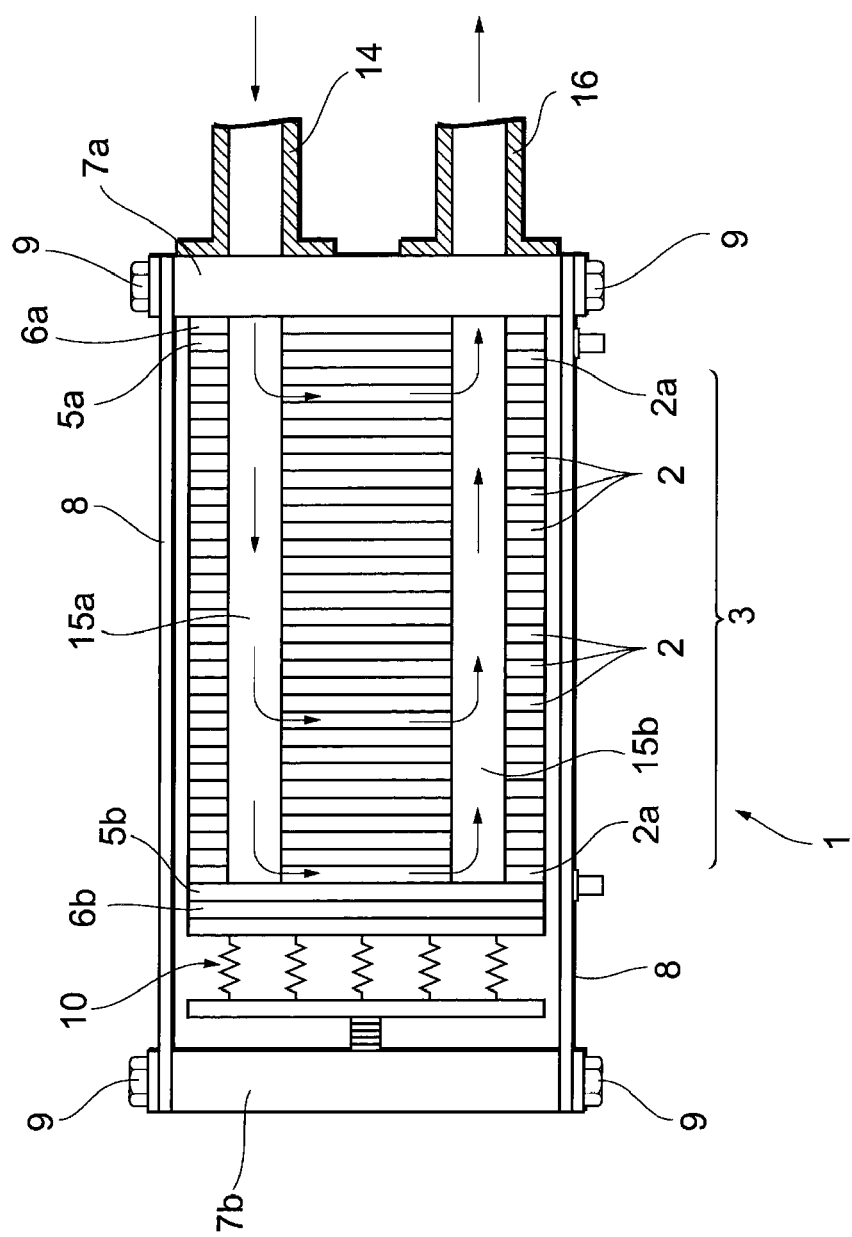
FIG. 2 is a side view showing a part of an inside of a fuel cell.

As shown in FIGS. 1 and 2, a fuel cell 1 with a stack structure comprises a cell laminate 3 formed by laminating a plurality of polymer electrolyte single cells 2. Current collectors 5a and 5b, insulating plates 6a and 6b, and end plates 7a and 7b are respectively arranged on the outside of single cells 2 (hereinafter referred to as "end cells 2a") at both ends of the cell laminate 3. Tension plates 8 are suspended between the end plates 7a and 7b and are fixed by bolts 9. An elastic modulus 10 is provided between the end plate 7b and the insulating plate 6b.

Hydrogen gas as a fuel gas, air as an oxidation gas, and a cooling medium are supplied from a supply pipe 14 connected to the supply ports 11a, 12a, and 13a of the end plate 7a to a manifold 15a in the cell laminate 3. Subsequently, the hydrogen gas, air, and the cooling medium flow in a planar direction of the single cell 2, reach a manifold 15b in the cell laminate 3, and are discharged to the outside of the fuel cell 1 from an exhaust pipe 16 connected to exhaust ports 11b, 12b, and 13b of the end plate 7a. Moreover, while the supply pipe 14, the manifolds 15a and 15b, and the exhaust pipe 16 are provided for each of the fluids including the hydrogen gas, air, and the cooling medium, in FIG. 2, the supply pipes 14, the manifolds 15a and 15b, and the exhaust pipes 16 are denoted by the same reference characters and descriptions thereof are omitted.

Figure 3:
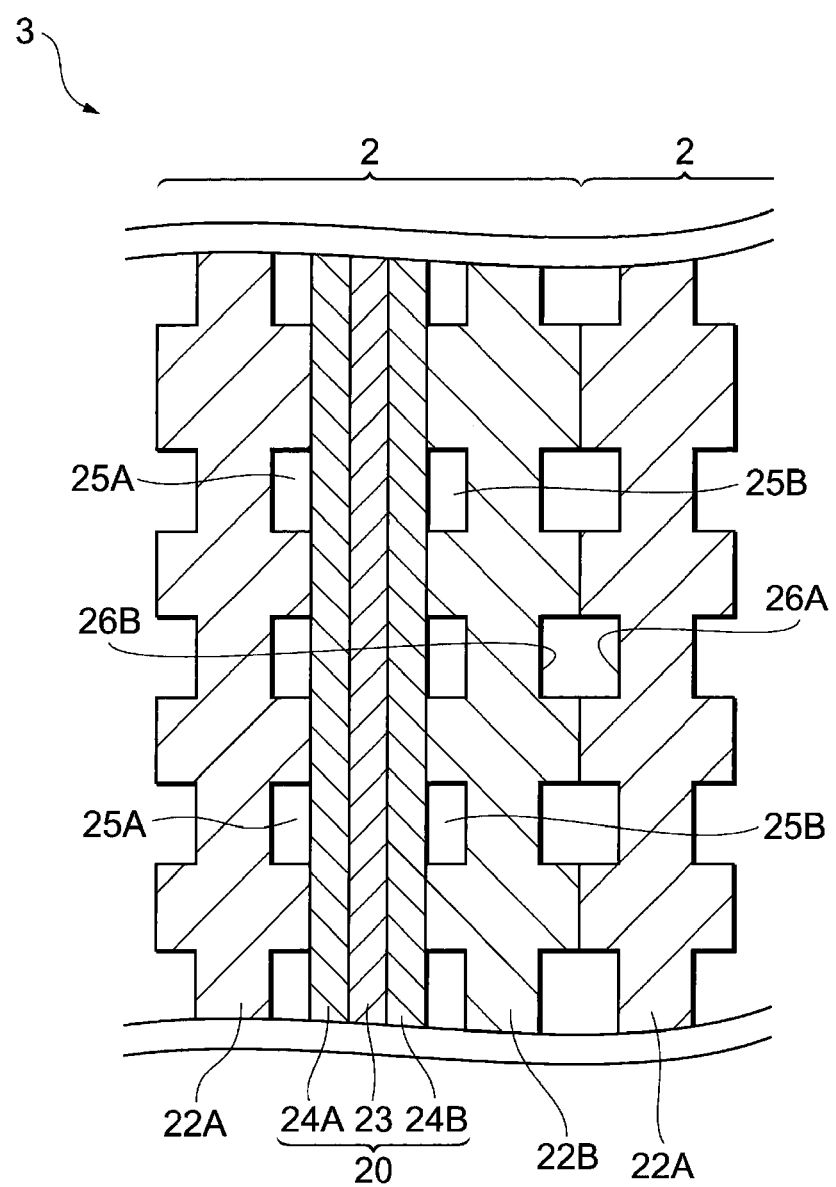
FIG. 3 is a cross-sectional view of a single cell.
Figure 4:
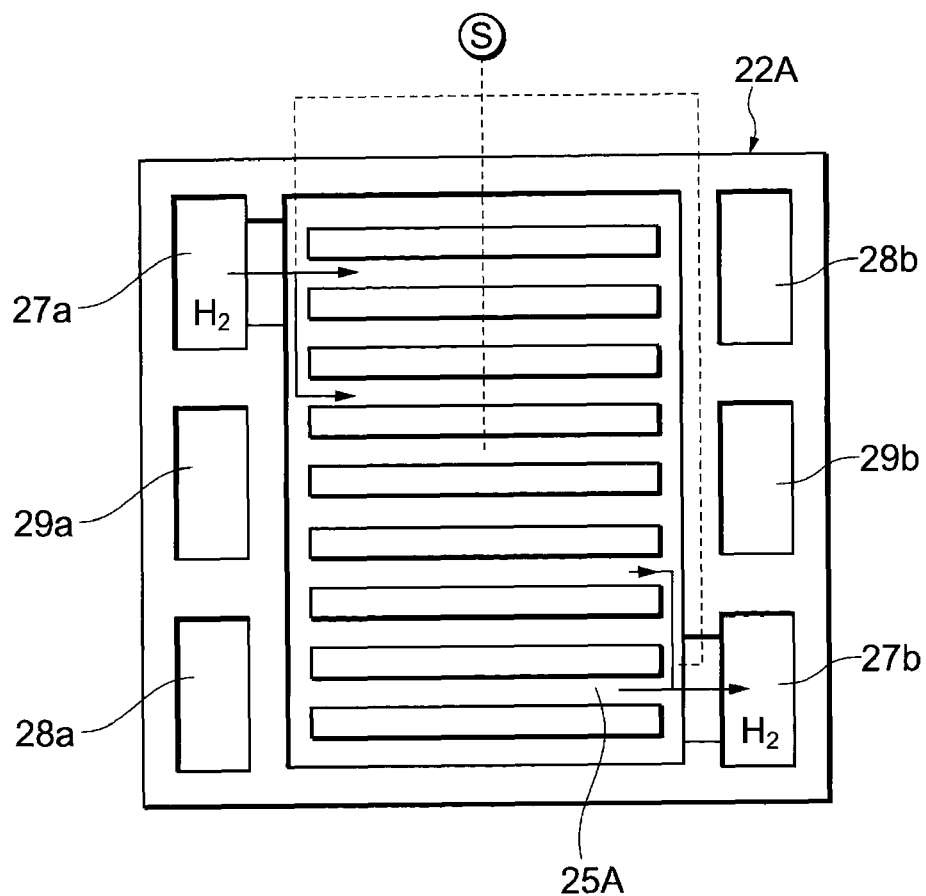
FIG. 4 is a plan view of a separator.

As shown in FIG. 3, the single cell 2 comprises an MEA 20 and a pair of separators 22A and 22B. The MEA 20 (membrane-electrode assembly) is made up of an electrolyte membrane 23 comprising an ion-exchange membrane, and an anode electrode 24A and a cathode electrode 24B which sandwich the electrolyte membrane 23. A hydrogen flow channel 25A of the separator 22A faces the electrode 24A and an air flow channel 25B of the separator 22B faces the electrode 24B. In addition, cooling medium flow channels 26A and 26B of the separators 22A and 22B communicate with each other between adjacent single cells 2. As shown in FIG. 4, the single cell 2 is provided with a sensor S that detects a water content state in an anode electrode plane of the hydrogen flow channel 25A on the side of the anode electrode 24A in the cell 2. The sensor S is capable of detecting a water content state of respective positions in the plane of the anode electrode 24A of the hydrogen flow channel 25A such as an inlet position, an outlet position, and an intermediate position of the inlet and outlet positions of the hydrogen flow channel 25A.

FIG. 4 is a plan view of the separator 22A. The separator 22A comprises a hydrogen inlet 27a, an air inlet 28a, an cooling medium inlet 29a, a hydrogen outlet 27b, an air outlet 28b, and a cooling medium outlet 29b respectively formed to penetrate to the outside of the hydrogen flow channel 25A. The inlets 27a, 28a, and 29a constitute a part of manifolds 15a respectively corresponding to each fluid and, similarly, the outlets 27b, 28b, and 29b constitute a part of manifolds 15b respectively corresponding to each fluid.

At the separator 22A, hydrogen gas is introduced into the hydrogen flow channel 25A from the inlet 27a and is discharged to the outlet 27b. This also applies to a flow of the cooling medium. In addition, although not described in detail, air also flows in a planar direction in the separator 22B which has a similar configuration to the separator 22A. In this manner, hydrogen gas and air are supplied to the electrodes 24A and 24B in the single cell 2. As a result, an electrochemical reaction occurs in the MEA 20 and electromotive force is obtained. In addition, due to the electrochemical reaction, water is created at the cathode electrode 24B, whereby the water moves from the cathode electrode 24B to the anode electrode 24A to be absorbed by the electrolyte membrane 23 in the cell 2 or the like.

Figure 5:
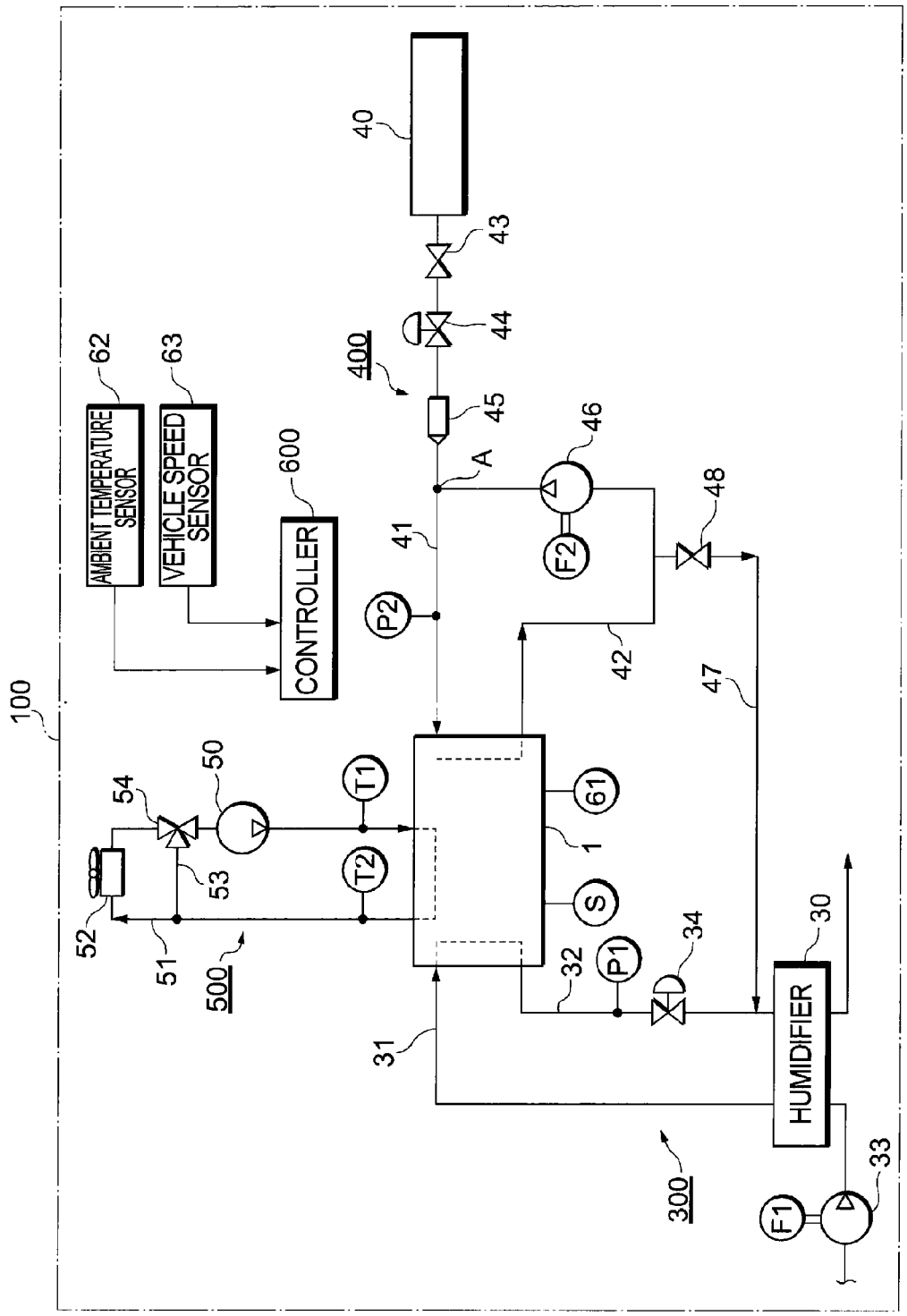
FIG. 5 is a configuration diagram of a fuel cell system.

As shown in FIG. 5, the fuel cell system 100 comprises an air piping system 300, a hydrogen piping system 400, a cooling medium piping system 500, and a controller 600. The fuel cell system 100 can be mounted on various mobile objects such as a vehicle, a ship, an airplane, and a robot, and can also be applied to a stationary power source. Here, an example of the fuel cell system 100 mounted on an automobile will be described.

The air piping system 300 supplies air to and discharges air from the fuel cell 1, and comprises a humidifier 30, a supply flow channel 31, an exhaust flow channel 32, and a compressor 33. Ambient air (air in a low moisture state) is taken in by the compressor 33 and pressure-fed to the humidifier 30. Moisture exchange between the air and an oxidation offgas in a high moisture state is performed at the humidifier 30. As a result, moderately humidified air is supplied from the supply flow channel 31 to the fuel cell 1. A back pressure valve 34 for adjusting an air back pressure of the fuel cell 1 is provided in the exhaust flow channel 32. In addition, a pressure sensor P1 that detects an air back pressure is provided in a vicinity of the back pressure valve 34. A flow rate sensor F1 that detects an air supply flow rate to the fuel cell 1 is provided at the compressor 33.

The hydrogen piping system 400 supplies hydrogen gas to and discharges hydrogen gas from the fuel cell 1, and comprises a hydrogen supply source 40, a supply flow channel 41, a circulation flow channel 42, a shut valve 43, and the like. The hydrogen gas from the hydrogen supply source 40 is decompressed by a regulator 44 and is then subjected to high-precision adjustment of a flow rate and pressure by an injector 45. Subsequently, the hydrogen gas joins a hydrogen offgas pressure-fed by a hydrogen pump 46 as a gas circulator on the circulation flow channel 42 at a confluence A and is then supplied to the fuel cell 1. An exhaust flow channel 47 including an exhaust/drain valve 48 is branched and connected to the circulation flow channel 42. By opening the exhaust/drain valve 48, a hydrogen offgas is discharged to the exhaust flow channel 32. A pressure sensor P2 that detects a supply pressure of hydrogen gas to the fuel cell 1 is provided downstream of the confluence A. In addition, a flow rate sensor F2 is provided at the hydrogen pump 46. Moreover, in other embodiments, a fuel offgas may be introduced into a hydrogen diluter or the like or a gas-liquid separator may be provided in the circulation flow channel 42.

The cooling medium piping system 500 circulates and supplies a cooling medium (for example, cooling water) to the fuel cell 1, and comprises a cooling pump 50, a cooling medium flow channel 51, a radiator 52, a bypass flow channel 53, and a changeover valve 54. The cooling pump 50 pressure-feeds a cooling medium in the cooling medium flow channel 51 into the fuel cell 1. The cooling medium flow channel 51 comprises a temperature sensor T1 positioned at a cooling medium inlet of the fuel cell 1 and a temperature sensor T2 positioned at a cooling medium outlet of the fuel cell 1. The radiator 52 cools a cooling medium discharged from the fuel cell 1. The changeover valve 54 comprises a rotary valve or the like and, when necessary, switches over conduction of the cooling medium between the radiator 52 and the bypass flow channel 53.

The controller 600 is configured as a microcomputer internally comprising a CPU, a ROM, and a RAM. Information detected by the sensors (S, P1, P2, F1, F2, T1, and T2) which detect pressure, a temperature, a flow rate, and the like of fluids flowing through the respective piping systems 300, 400, and 500 is inputted to the controller 600. Furthermore, in addition to information detected by a current sensor 61 that detects a value of a current generated by the fuel cell 1, information detected by an ambient temperature sensor 62, a vehicle speed sensor 63, an accelerator opening sensor, and the like is inputted to the controller 600. In accordance with the detected information and the like, the controller 600 controls the various devices (the compressor 33, the shut valve 43, the injector 45, the hydrogen pump 46, the exhaust/drain valve 48, the cooling pump 50, the changeover valve 54, and the like) in the system 100 and integrally controls operations of the fuel cell system 100. In addition, based on detected information from the sensor S, the controller 600 adjusts a flow rate and pressure of hydrogen gas supplied to the anode electrode 24A of the fuel cell 1 so as to satisfy a predetermined restrictive condition, and controls a water content in the cell 2 of the fuel cell 1.

Figure 6:
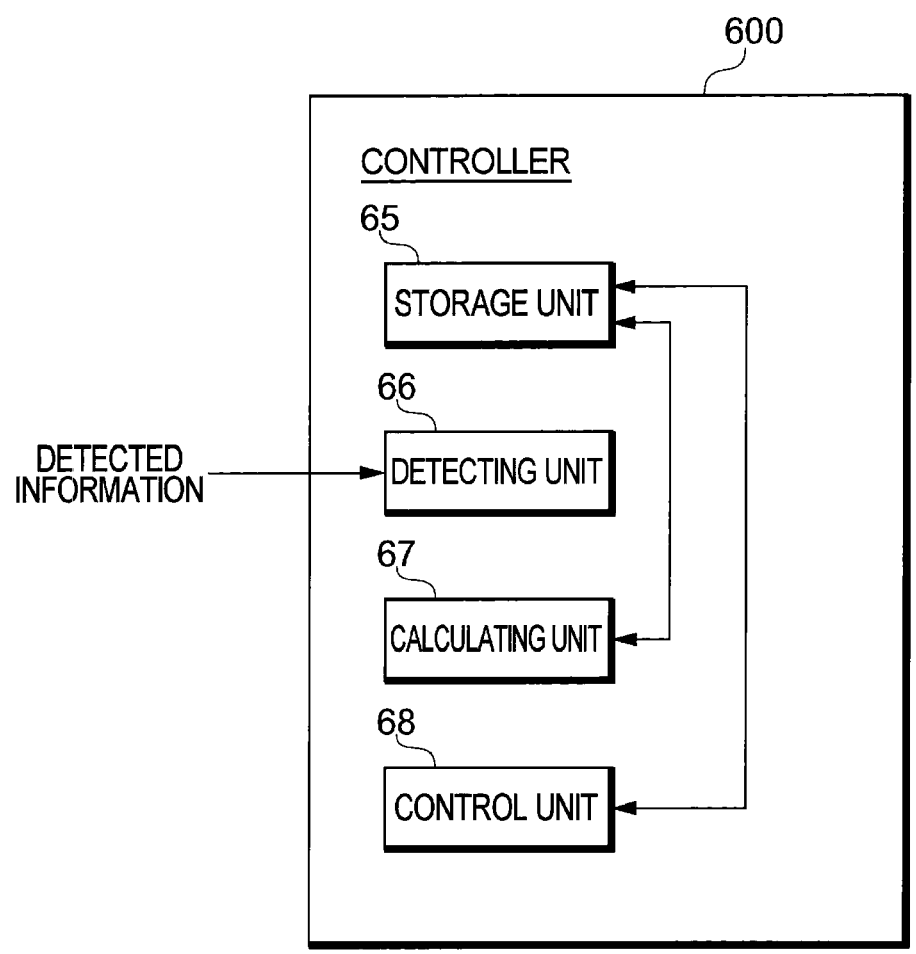
FIG. 6 is a functional block diagram of a controller.

As shown in FIG. 6, for example, the controller 600 comprises a storage unit 65, a detecting unit 66, a calculating unit 67, and a control unit 68 as function blocks for adjusting a flow rate and pressure of hydrogen gas at the anode electrode 24A so as to satisfy a predetermined restrictive condition and for controlling a water content in the cell 2 of the fuel cell 1. The storage unit 65 stores various programs for determining a target water content of each position in a plane of the anode electrode 24A of the hydrogen flow channel 25A of the cell 2, calculating a hydrogen gas flow rate and a hydrogen gas pressure which enable the target water content to be achieved so as to satisfy a restrictive condition, and controlling the hydrogen gas flow rate and the hydrogen gas pressure based on the calculation. The storage unit 65 also stores various information. The detecting unit 66 reads information detected by the sensor S with respect to a water content state in the cell 2. Based on information acquired by the detecting unit 66 and the like, the calculating unit 67 executes a program in the storage unit 65 and calculates a target water content of a predetermined position in the hydrogen flow channel 25A of the cell 2 as well as a hydrogen gas flow rate and a hydrogen gas pressure which enable the target water content to be achieved while satisfying a restrictive condition. Based on a result from the calculating unit 67, the control unit 68 transmits a control order to each device and controls operations so that the fuel cell 1 enters a desired water content state.

Next, a description will be given of an example of a method of controlling a water content of the fuel cell 1 which is executed in the fuel cell system 100 configured as described above.

Figure 7:
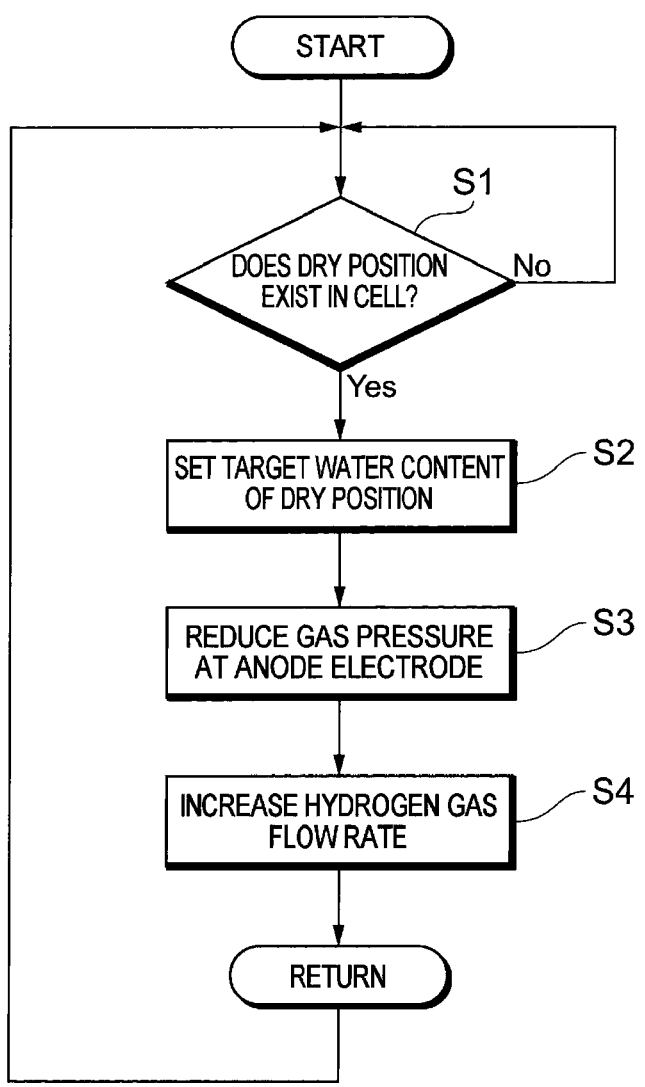
FIG. 7 is a flow chart showing a method of controlling a water content in a cell.

In the present control example, a flow rate and pressure of hydrogen gas supplied to the anode electrode 24A of the cell 2 of the fuel cell 1 are adjusted so as to satisfy a predetermined restrictive condition in order to control a water content in the cell 2 of the fuel cell 1. For example, this control is executed by the control unit 68 upon receiving a signal from the calculating unit 67. FIG. 7 is a flow chart of the present control example.

First, the sensor S detects a water content state of each position in a plane of the anode electrode 24A of the hydrogen flow channel 25A of the cell 2 of the fuel cell 1 and, based on the detection result, a determination is made on whether or not a dry position exists in the cell 2 (step S1). A presence/absence of the dry position is determined based on, for example, whether or not a water content of each position in the hydrogen flow channel 25A in the cell 2 exceeds a threshold set in advance. In addition, the determination of a presence/absence of a dry position is performed continuously, intermittently, or regularly.

Figure 8:
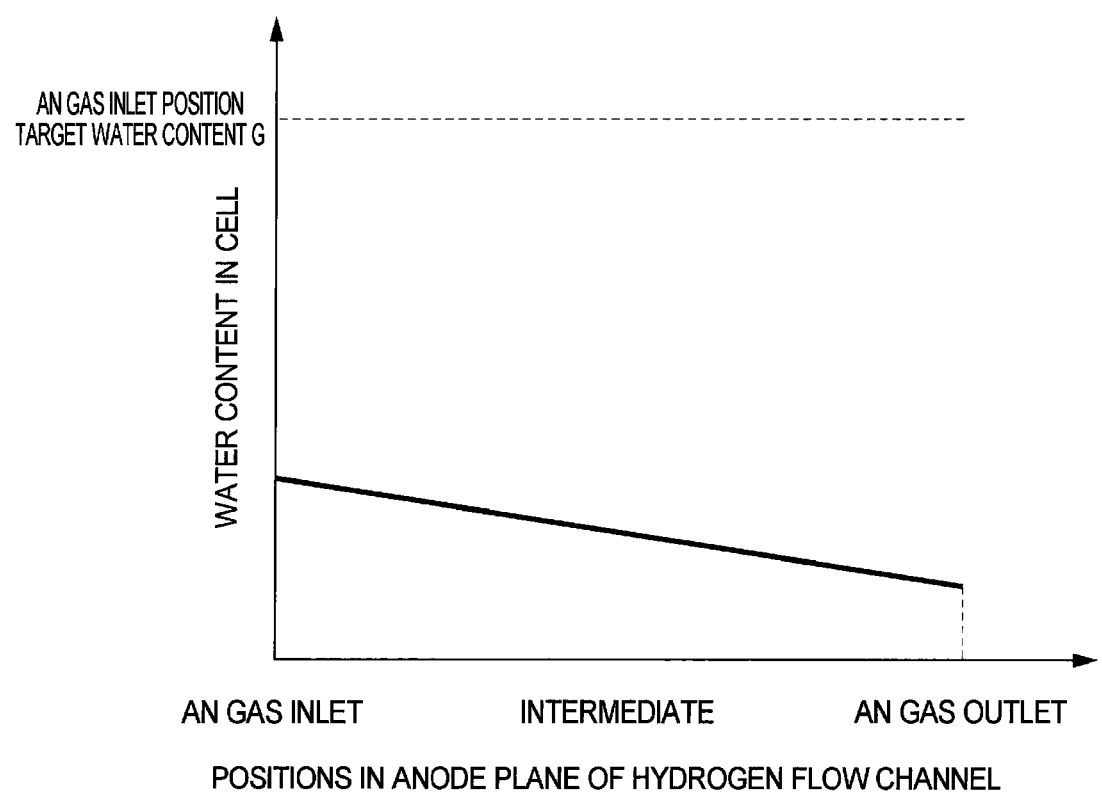
FIG. 8 is a graph showing an example of a water content in a cell.

When there is a dry position in the cell 2, a target water content of the dry position is determined (step S2). For example, a target water content set in advance is used. For example, when a water content state represented by the graph shown in FIG. 8 is detected and a gas inlet position of the hydrogen flow channel 25A on a side of the anode electrode (AN) 24A is determined as a dry position, a target water content G of the inlet position is set. Moreover, when a dry position does not exist in the hydrogen flow channel 25A, a return is made to the start.

Figure 9:
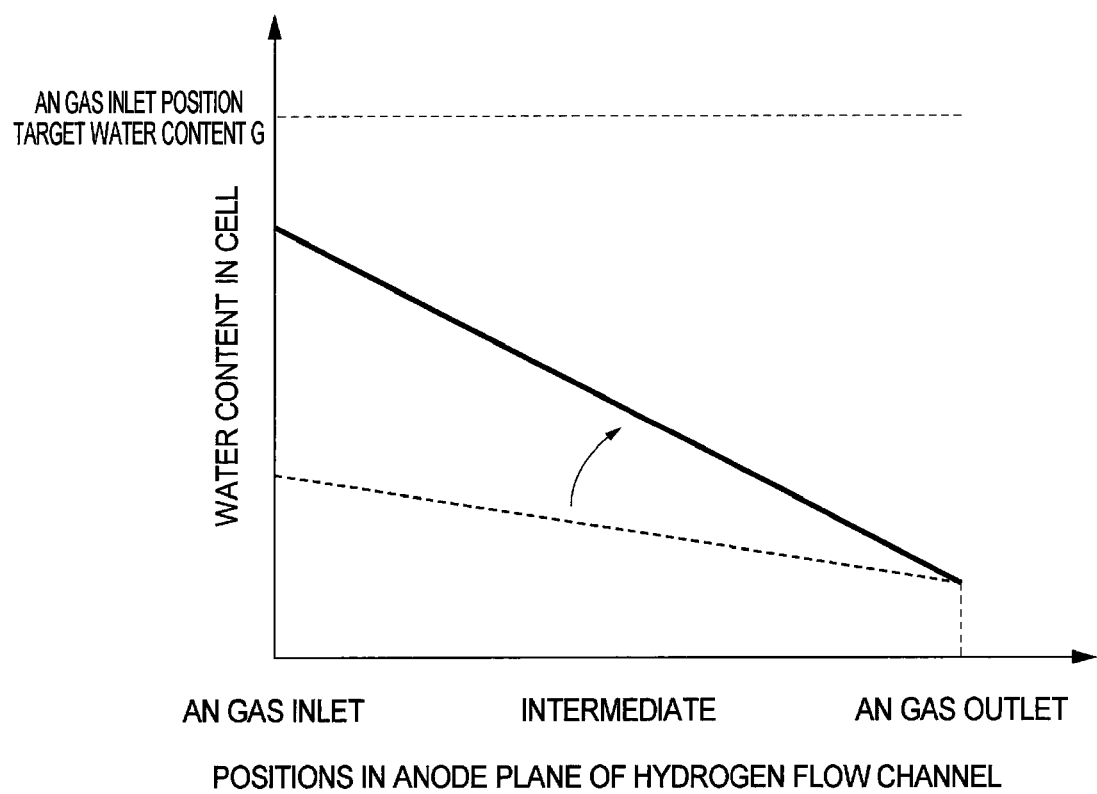
FIG. 9 is a graph showing an example of a water content in a cell when hydrogen gas pressure is reduced.

Next, in order to achieve the target water content G, first, a hydrogen gas pressure at the anode electrode 24A is reduced (step S3). For example, the reduction of the hydrogen gas pressure is realized by increasing an output of the hydrogen pump 46 and performing offgas discharge at a high level. By reducing the pressure of the hydrogen gas, as shown in FIG. 9, a gradient of a line of a graph representing a water content at each position in the hydrogen flow channel 25A of the cell 2 increases. Accordingly, a water content at the gas inlet position of the hydrogen flow channel 25A approaches the target water content G.

The reduction of the hydrogen gas pressure is performed so as to satisfy two restrictive conditions including securing a predetermined partial pressure of hydrogen gas of the hydrogen flow channel 25A on the side of the anode electrode 24A and securing discharge characteristics of an offgas discharged from the anode electrode 24A.

Specifically, when securing a hydrogen gas partial pressure, a lower limit of hydrogen gas pressure is determined such that a hydrogen gas partial pressure at the anode electrode 24A does not fall below a threshold (lower limit) set in advance. Offgas discharge characteristics are set such that when an exposure to ambient air is performed while discharging gas, a lower limit of the hydrogen gas pressure is higher than atmospheric pressure. Hydrogen gas pressure is set to a minimum pressure in a range that satisfies the restrictive conditions described above. Consequently, the gradient of the line of the graph shown in FIG. 9 becomes a maximum gradient in a range that satisfies the restrictive conditions described above.

Figure 10:
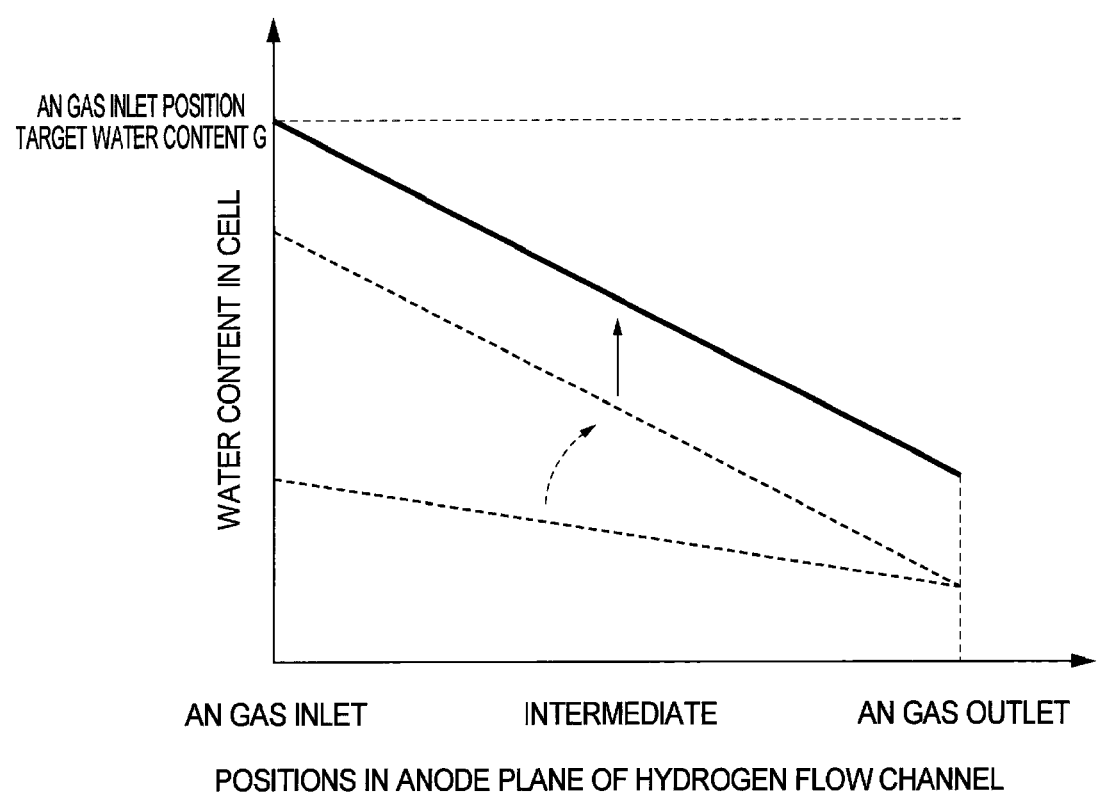
FIG. 10 is a graph showing an example of a water content in a cell when hydrogen gas pressure is increased.

Next, in order to achieve the target water content G, a hydrogen gas flow rate (volume flow rate) at the anode electrode 24A is increased (step S4). For example, the increase of the hydrogen gas flow rate is realized by increasing an output of the hydrogen pump 46 and increasing a circulation flow rate. By increasing the hydrogen gas flow rate, as shown in FIG. 10, a value of a line of a graph representing a water content corresponding to each position in the hydrogen flow channel 25A increases overall and the line of the graph shifts upward. Accordingly, a water content at the gas inlet position of the hydrogen flow channel 25A reaches the target water content G.

The increase of the hydrogen gas flow rate is performed so as to satisfy two restrictive conditions including a power loss of the hydrogen pump 46 (an electrical consumption of the hydrogen pump 46) not exceeding an upper limit and the hydrogen gas flow rate not exceeding a flow rate corresponding to an upper limit of a water displacement from the cathode electrode (CA) 24B to the anode electrode 24A. Moreover, water displacement and hydrogen gas flow rate are in a relationship shown in FIG. 11, wherein while water displacement increases as the hydrogen gas flow rate increases up to a certain value, water displacement subsequently remains constant even if the hydrogen gas flow rate increases.

Figure 11:
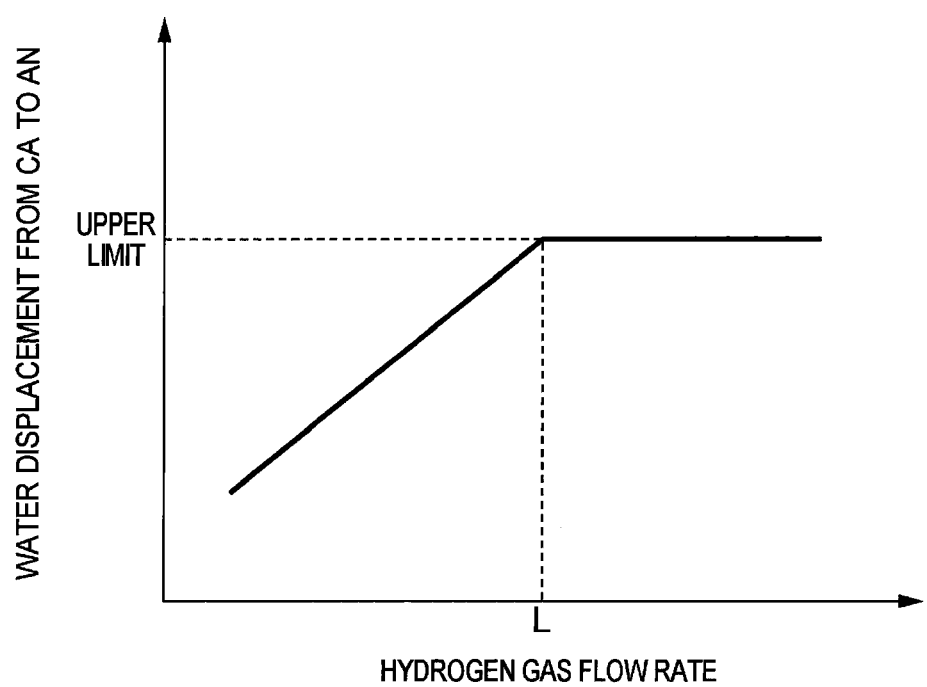
FIG. 11 is a graph showing a relationship between a hydrogen gas flow rate and water displacement.

Specifically, as for an upper limit of power loss of the hydrogen pump 46, an upper limit of a hydrogen gas flow rate is determined such that a current value of the hydrogen pump 46 which indicates power loss does not exceed a threshold set in advance. As for an upper limit of water displacement, hydrogen gas flow rate is set so as not to exceed a flow rate L at which water displacement reaches an upper limit as shown in FIG. 11. Moreover, the hydrogen gas flow rate may be set to the flow rate L. When the hydrogen gas flow rate is increased and the adjustment of the water content in the cell 2 is completed, a return is once again made to the start and the sequence is repeated.

According to the embodiment described above, by adjusting a flow rate and pressure of hydrogen gas supplied to the anode electrode 24A of the cell 2 of the fuel cell 1, the water content in the cell 2 can be properly adjusted so as to satisfy a predetermined restrictive condition. In addition, with the present embodiment, since a dry position in the cell 2 is favorably resolved, for example, electrical generation during a high temperature operation of the fuel cell 1 can be performed efficiently.

Since one restrictive condition is that a hydrogen gas flow rate does not exceed a flow rate at which water displacement from the cathode electrode 24B to the anode electrode 24A in the cell 2 reaches an upper limit, a situation can be prevented in which, due to the hydrogen gas flow rate becoming excessive in comparison to the water displacement, an amount of water taken away by the gas from inside the cell 2 increases and causes drying in the cell 2. Accordingly, a decrease in electric generating efficiency attributable to a decrease in moisture in the cell 2 can be prevented.

In addition, since another restrictive condition is that a predetermined partial pressure of hydrogen gas supplied to the anode electrode 24A in the cell 2 be secured, a situation can be prevented in which partial pressure of hydrogen gas declines excessively and an electric generating capacity of the fuel cell 1 declines.

Furthermore, since another restrictive condition is that discharge characteristics of offgas discharged from the anode electrode 24A in the cell 2 be secured, offgas can be properly discharged.

Since the other restrictive condition is that a hydrogen gas flow rate does not exceed a flow rate at which a power loss of the hydrogen pump 46 reaches an upper limit, a situation can be prevented in which the power loss of the hydrogen pump 46 equals or exceeds an assumed level and energy efficiency of the entire fuel cell system 100 deteriorates.

In the embodiment described above, since a water content state in the cell 2 is detected by the sensor S and, based on the detection result, a flow rate and pressure of hydrogen gas are adjusted so that the water content in the cell 2 equals a target water content, a final adjustment of the water content in the cell 2 can be performed in an accurate and reliable manner.

In addition, since a water content state at a predetermined position in a plane of the anode electrode 24A of the hydrogen flow channel 25A of the cell 2 is detected and, based on the detection result, a flow rate and pressure of hydrogen gas are adjusted so that the water content at the predetermined position in the cell 2 equals a target water content G, the water content in the cell 2 can be adjusted in a more rigorous manner. Moreover, while the present embodiment describes an example of control performed so that a water content at a gas inlet position of the hydrogen flow channel 25A equals a target water content, a water content of another position in the hydrogen flow channel 25A such as an intermediate position or a gas outlet position may be controlled instead.

Furthermore, while a dry position in the cell 2 is detected and a water content of the dry position is adjusted in the embodiment described above, alternatively, a water-excessive position in the cell 2 may be detected and a water content of the water-excessive position may be adjusted. In such a case, in a similar manner to the case described above in which a dry position is detected, first, a target water content of the water-excessive position is determined, hydrogen gas pressure at the anode electrode 24A is then increased and, finally, a hydrogen gas flow rate at the anode electrode 24A is reduced. Moreover, the hydrogen gas pressure is increased and the hydrogen gas flow rate is reduced so as to satisfy predetermined restrictive conditions in a similar manner to the embodiment described above.

While a preferred embodiment of the present invention has been described with reference to the drawings, the present invention is not limited to such an example. It will be obvious to those skilled in the art that various changes and modifications may be made without departing from the spirit and the scope of the invention as hereinafter claimed. It is to be understood that all such changes and modifications also belong to the technical scope of the present invention.

For example, while a fuel cell system 100 mounted to a fuel cell vehicle has been described in the embodiment above, a fuel cell system may be mounted to various mobile objects (a robot, a ship, an airplane, and the like) other than a fuel cell vehicle. In addition, the fuel cell system may also be applied to a stationary power source that is used as an electric power facility of a building (a residence, a commercial building, or the like). Furthermore, while hydrogen gas has been used as a fuel gas, other gases may be used as long as such gases generate water by an electrochemical reaction during electrical generation.

EXPLANATION OF REFERENCE NUMERALS 1 fuel cell
2 single cell
23 electrolyte membrane
24A anode electrode
24B cathode electrode
25A hydrogen flow channel
68 control unit
100 fuel cell system
600 controller

We claim:
1. A fuel cell system having a fuel cell, the fuel cell system comprising:
 a control unit that is programmed to adjust a flow rate and a pressure of a fuel gas supplied to an anode electrode of a cell of the fuel cell to control a water content in the cell, wherein, in response to a detection of a dry position in the cell,
 the control unit is programmed to reduce the pressure of the fuel gas, and the control unit is further programmed, subsequently to reducing the pressure of the fuel gas, to increase the flow rate of the fuel gas in order to not exceed an upper limit of a power loss of a gas circulator, which processes off-gas discharged from the fuel cell and supplies the processed off-gas to the anode electrode.

2. The fuel cell system according to claim 1, wherein the control unit is programmed to reduce the pressure of the fuel gas in order to secure a predetermined partial pressure of the fuel gas supplied to the anode electrode.

3. The fuel cell system according to claim 1, wherein the control unit is programmed to reduce the pressure of the fuel gas in order to secure discharge characteristics of a gas discharged from the anode electrode.

4. The fuel cell system according to claim 1, further comprising:
   a detecting member that detects a water content state in the cell, wherein
      the control unit is programmed to adjust, based on a detection result by the detecting member, the flow rate and the pressure of the fuel gas so that the water content in the cell equals a target water content.

5. The fuel cell system according to claim 4, wherein
   the detecting member detects the water content state at a predetermined position in an anode electrode plane of a gas flow channel on a side of the anode electrode of the cell, and
   the control unit is programmed to adjust, based on a detection result by the detecting member, the flow rate and the pressure of the fuel gas so that the water content at the predetermined position of the cell equals the target water content.

6. The fuel cell system according to claim 1, wherein the control unit is further programmed to increase the flow rate of the fuel gas in order to not exceed a flow rate at which a water displacement from a cathode electrode to the anode electrode in the cell reaches an upper limit.

* * * * *